United States Patent
Oh

(10) Patent No.: US 11,308,707 B2
(45) Date of Patent: Apr. 19, 2022

(54) AUTOMATED GRADING OF CLOTHING PATTERNS OF GARMENT

(71) Applicant: CLO Virtual Fashion Inc., Seoul (KR)

(72) Inventor: Seungwoo Oh, Seoul (KR)

(73) Assignee: CLO VIRTUAL FASHION INC., Seoul (KR)

( * ) Notice: Subject to any disclaimer, the term of this patent is extended or adjusted under 35 U.S.C. 154(b) by 0 days.

(21) Appl. No.: 16/996,490

(22) Filed: Aug. 18, 2020

(65) Prior Publication Data
US 2021/0056767 A1 Feb. 25, 2021

(30) Foreign Application Priority Data

Aug. 19, 2019 (KR) .................. 10-2019-0101261
Dec. 31, 2019 (KR) .................. 10-2019-0179473

(51) Int. Cl.
| | |
|---|---|
| *G06T 15/00* | (2011.01) |
| *G06T 19/20* | (2011.01) |
| *G06T 17/20* | (2006.01) |
| *G06Q 30/06* | (2012.01) |
| *G06K 9/00* | (2022.01) |

(52) U.S. Cl.
CPC .......... *G06T 19/20* (2013.01); *G06K 9/00369* (2013.01); *G06Q 30/0643* (2013.01); *G06T 17/20* (2013.01); *G06T 2219/2021* (2013.01); *G06T 2219/2024* (2013.01)

(58) Field of Classification Search
CPC ........ G06T 17/20; G06T 17/205; G06T 19/20
See application file for complete search history.

(56) References Cited

U.S. PATENT DOCUMENTS

| | | | |
|---|---|---|---|
| 2006/0029243 A1* | 2/2006 | Gerrard | H04S 3/00 381/310 |
| 2016/0314604 A1* | 10/2016 | Oh | G06T 11/20 |
| 2017/0161948 A1 | 6/2017 | Hua et al. | |
| 2017/0337732 A1* | 11/2017 | Tamersoy | G06K 9/6256 |

FOREIGN PATENT DOCUMENTS

KR 10-2014-0108451 A 9/2014

OTHER PUBLICATIONS

Allen, B. et al., "The space of human body shapes: reconstruction and parameterization from range scans," ACM Transactions on Graphics, Jul. 2003, pp. 587-594.
Baraff, D. et al., "Large Steps in Cloth Simulation," SIGGRAPH 98, Jul. 1998, pp. 43-54.

(Continued)

*Primary Examiner* — Charles Tseng
(74) *Attorney, Agent, or Firm* — Fenwick & West LLP

(57) ABSTRACT

Provided is an automatic grading method including calculating a first strain ratio between a three-dimensional (3D) source avatar and a 3D target avatar, determining a mapping relationship between 3D source garment draped over the source avatar and a body portion of the source avatar, converting the source garment into 3D target garment draped over the target avatar, based on the first strain ratio and the mapping relationship, and outputting a two-dimensional (2D) target pattern constituting the target garment.

18 Claims, 12 Drawing Sheets

(56) References Cited

OTHER PUBLICATIONS

Brouet, R. et al., "Design Preserving Garment Transfer," ACM Transactions on Graphics, Association for Computing Machinery, Jul. 2012, pp. 1-11.
Sumner, R.W. et al., "Deformation Transfer for Triangle Meshes," ACM Transactions on Graphics, Aug. 2004, pp. 399-405.
Wang, H., "Rule-Free Sewing Pattern Adjustment with Precision and Efficiency," ACM Trans. Graph., vol. 37, No. 4, Article 53, Aug. 2018, pp. 1-13.

\* cited by examiner

Source avatar      Target avatar

AUTOMATED GRADING OF CLOTHING PATTERNS OF GARMENT

CROSS-REFERENCE TO RELATED APPLICATIONS

This application claims the benefit of Republic of Korea Patent Application No. 10-2019-0101261 filed on Aug. 19, 2019 and Republic of Korea Patent Application No. 10-2019-0179473 filed on Dec. 31, 2019, the entire disclosures of which are incorporated herein by reference for all purposes.

BACKGROUND

1. Field of the Invention

The disclosure relates to automatic grading of clothing patterns for a garment.

2. Description of the Related Art

A garment appears in three dimensions when worn on a person's body, but the garment is formed of two-dimensional (2D) patterns that are adjoined together. Because flexible fabric is often used as the material for the 2D patterns, the garment may take on a different shape depending on who wears it. Grading refers to a work of scaling up or down a clothing pattern of one size for draping people of different sizes.

SUMMARY

Embodiments relate to an automatic grading method for generating a digital representation of a target garment that that is a graded version of a source garment. Avatar strain ratios representing differences in a shape of a three-dimensional (3D) source avatar and a shape of a 3D target avatar are determined. One or more of the body portions of the 3D source avatar having different shapes compared to corresponding one or more of the body portions of the 3D target avatar are determined. Mapping relationships between portions of a 3D source garment and the body portions of the 3D source avatar, the 3D source garment dimensioned for draping the 3D source avatar and comprising a plurality of adjoined two-dimensional (2D) source patterns are determined. shapes of two-dimensional (2D) target patterns of a 3D target garment dimensioned for draping the 3D target avatar are determined by processing the avatar strain ratios and the mapping relationships.

In one or more embodiments, the shapes of the 2D target patterns are determined by determining one or more source avatar polygons mapped to each of source garment polygons as defined by the mapping relationships. The one or more source avatar polygons are part of a mesh representing a body portion of the source avatar. The source garment polygons form a source mesh representing the source garment. Each of the source garment polygons is deformed into each of target garment polygons that form a target mesh representing the target garment by applying a garment transfer function to each of the source garment polygons. The garment transfer function is a function of one or more transformation functions that transform one or more source avatar polygons mapped to each of the source garment polygons into corresponding one or more target avatar polygons. Pattern strains between source pattern polygons corresponding to the source garment polygons and target pattern polygons corresponding to the target garment polygons are determined. The target patterns are generated by applying the determined pattern strains to the source patterns.

In one or more embodiments. each of the source garment polygons is deformed into each of target garment polygons according to statistics on the avatar strain ratios.

In one or more embodiments, the target patterns are generated by determining a rate between the source strain and a target strain candidate of a target pattern candidate. The target strain candidate represents a target strain between the reference polygon and a polygon the target pattern candidate. The locations of the target pattern polygons that restrains a difference between the avatar strain ratios and the rate are determined by an optimization algorithm.

In one or more embodiments, the first rates are relaxed before determining the locations.

In one or more embodiments, the locations of the target pattern polygons are determined by further restraining deviations of curvatures of outlines of the target patterns relative to curvature of outlines of the source patterns.

In one or more embodiments, the locations of the target pattern polygons are determined by further restraining deviations of ratios of sewing lines between adjoining ones of the target patterns relative to ratios of sewing lines of adjoining ones of the source patterns.

In one or more embodiments, the avatar strain ratios are determined as deformations of unit polygons forming a mesh representing the target avatar and corresponding unit polygons forming another mesh representing the source avatar.

In one or more embodiments, the avatar strain ratios are determined by determining a transformation matrix indicating a deformation between a first tetrahedron defined by vertices of a source avatar polygon forming a mesh representing the source avatar and a second tetrahedron defined by vertices of a target avatar polygon forming another mesh representing the target avatar, the target avatar polygon corresponding to the source avatar polygon, and deriving the avatar strain ratios from the transformation matrix.

In one or more embodiments, determining of the mapping relationship includes determining the mapping relationship between a target pattern among 2D source patterns constituting the source garment and the body portion of the source avatar.

In one or more embodiments, the mapping relationships includes determining, for each source avatar polygon, a subset of source garment polygons closest to each source avatar polygon as portions of the source garment mapped to the body portions of the 3D source avatar. The subset of source garment polygons are registered as being mapped to each source avatar polygon in a mapping list.

BRIEF DESCRIPTION OF THE DRAWINGS

These and/or other aspects, features, and advantages of the invention will become apparent and more readily appreciated from the following description of example embodiments, taken in conjunction with the accompanying drawings.

DETAILED DESCRIPTION

Figure 1:
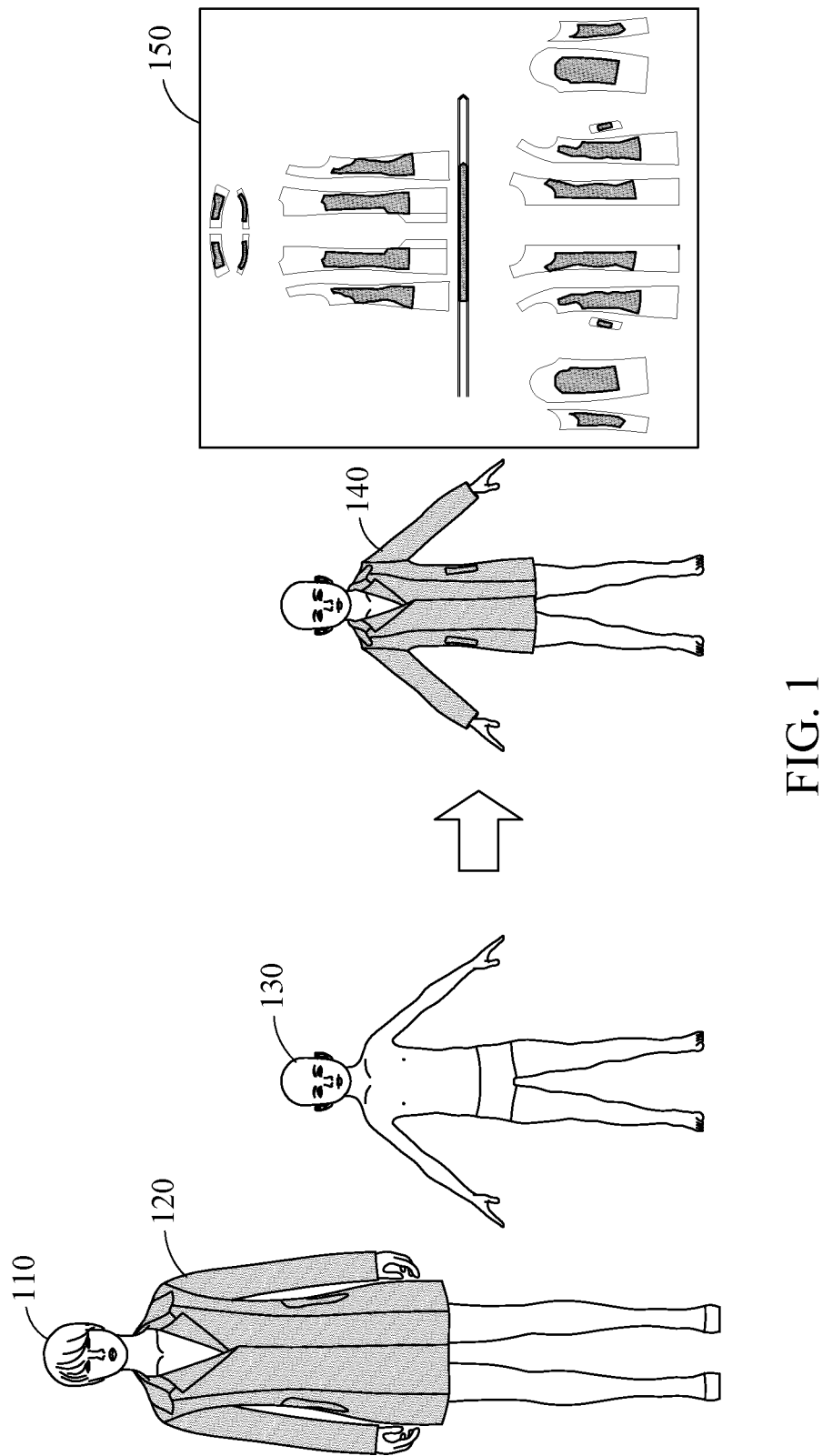
FIG. 1 is a conceptual diagram illustrating an automatic grading method, according to an embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

Furthermore, in describing embodiments with reference to the accompanying drawings, the same reference denotations are assigned to the same elements without regard to the drawing denotations, a duplicated description thereof will be omitted.

As described herein, "grading" refers to generating patterns of different sizes based on an original pattern of a single size. A target pattern of a newly generated size should be designed to fit a target avatar. To that end, a source pattern should also be deformed to the size of a target pattern in line with deformation of the target avatar relative to a source avatar. However, because each body portion of the target avatar is deformed relative to a corresponding body portion of the source avatar, accurate target patterns suitable for the target avatar may not be generated when different deformation of body portions is not taken into account. In one or more embodiments, a source pattern may deform in size for each body portion in line with different degrees of deformation in each body portion. Hence, more accurate target patterns for the target avatar may be made.

As described herein, a "source avatar" refers to a virtual 3D object draped with an original garment that is to be automatically graded.

As described herein, "a target avatar" corresponds to a virtual 3D object that is to be draped with a garment automatically graded from the original garment. The target avatar has at least one body portion that is dimensioned differently from the source garment.

A body type of a source avatar or a target avatar may be classified into features indicated in a physique according to height and/or weight and may include, for example, a skinny body type, a standard body type, an upper body obesity body, a lower body obesity type, an upper and lower body obesity type, a skinny fat body type, or the like. The body type of the source avatar or the target avatar may be determined based on, for example, a body size of a target to wear the source garment made by clothing patterns or a body size of an average person according to race, age, and/or gender.

The source avatar and the target avatar may include properties such as a body size, location coordinates of each body portion, and feature points. The "feature points" may correspond to points on a 3D avatar, which are important locations when a virtual garment is draped over the 3D avatar. The feature points may correspond to at least one of, for example, both arms, both wrists, left and right bodies, both shoulders, a head, a neck, both legs, left and right lower bodies, both ankles, an armpit, a groin, a pelvis, a hip, a stomach, a chest, both hands, both feet, both elbows, both knees, both fingertips, between both fingers, the back of both hands, the top of both feet, the tips of both toes, and both heels of the 3D avatar.

As described herein, "draping" refers to a process of combining pattern information or clothing patterns and dressing a 3D avatar in a 3D clothing object by a computer program.

FIG. 1 is a conceptual diagram illustrating automatic grading, according to an embodiment. Referring to FIG. 1, according to an example, a 3D source avatar 110, 3D source garment 120 draped over the source avatar 110, a 3D target avatar 130, 3D target garment 140 draped over the target avatar 130, and 2D target patterns 150 constituting the 3D target garment 140 are shown. The automatic grading method may automatically grade patterns of the target garment 140 from the source garment 120 worn on the source avatar 110 so that the target garment 140 would fit the target avatar 130 of a different size and/or body type compared to the source avatar 110.

Figure 6:
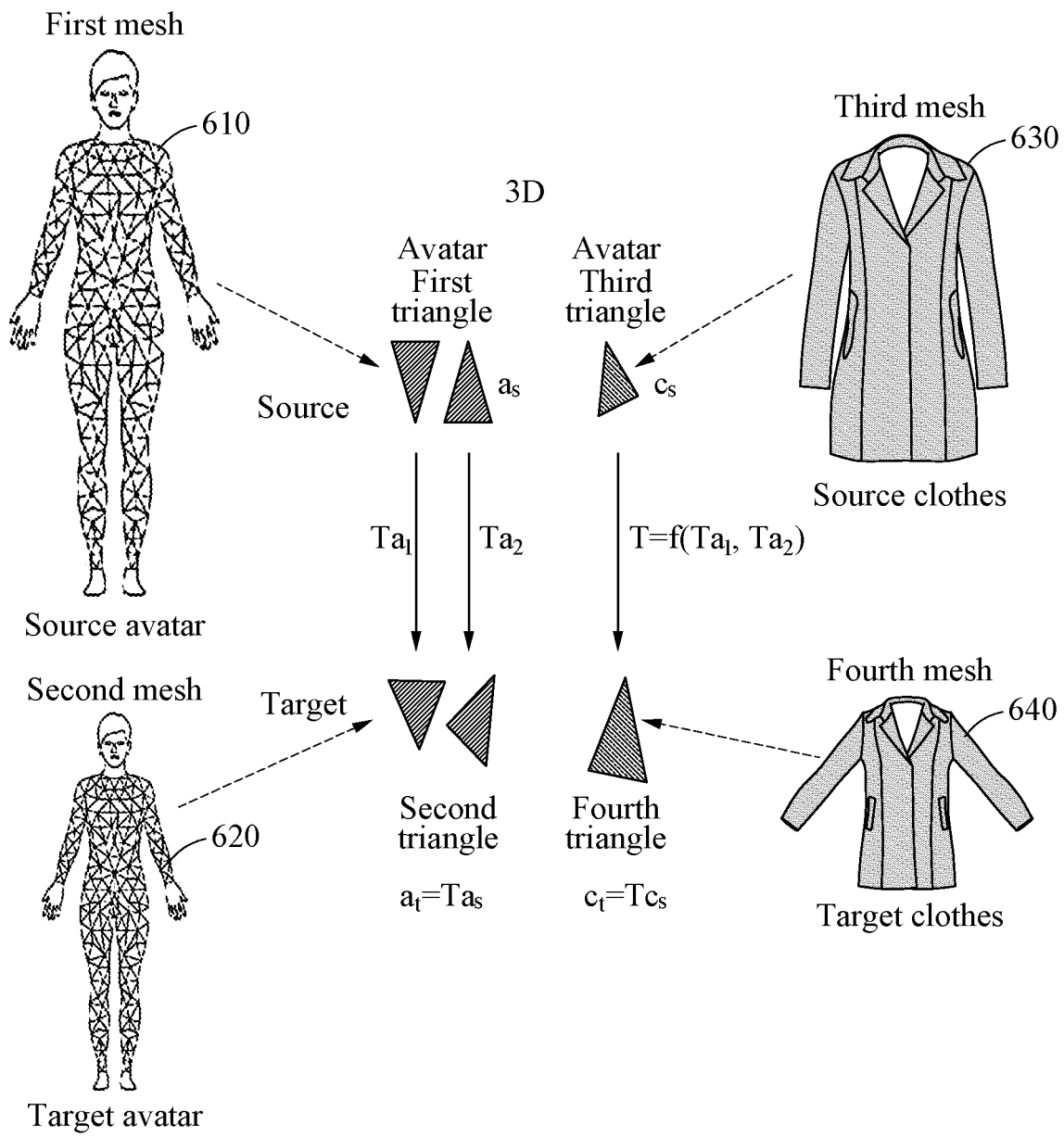
FIG. 6 is a conceptual diagram illustrating deforming a triangle of source garment into a triangle of target garment, according to an embodiment.

The source avatar 110 and/or the target avatar 130 may be modeled with, for example, a mesh of a unit figure as shown in FIG. 6 below. In some cases, the unit figure may be a 3D polyhedron (e.g., a tetrahedron). Hereinafter, for convenience of description, the description assumes that the unit figure included in a mesh is a polygon, particularly, a triangle. A mesh constituting the source avatar 110 is referred to as a "first mesh" or "source avatar mesh," and a triangle included in the first mesh is referred to as a "first triangle" or "source avatar polygon." Furthermore, a mesh constituting the target avatar 130 is referred to as a "second mesh" or "target avatar mesh", and a triangle included in the second mesh is referred to as a "second triangle" or "target avatar polygon."

The volume and/or shape of the source avatar 110 and the target avatar 130 are different. However, correspondence between triangles or polygons in the target avatar mesh and the source avatar mesh may be retained.

The source garment 120 may be garment draped over the 3D source avatar 110, which may correspond to a 3D virtual garment. The target garment 140 may be garment draped over the 3D target avatar 130, which may correspond to virtual 3D garment. In an embodiment, the source garment 120 and the target garment 140 may be represented by a mesh of polygons connected to each other at their vertices. The mesh constituting the source garment 120 is referred to as a "third mesh," and a triangle included in the third mesh is referred to as a "third triangle" or "source garment polygon." Furthermore, a mesh constituting the target garment 140 is referred to as a "fourth mesh" or "target garment polygon," and a triangle included in the fourth mesh is referred to as a "fourth triangle" or "target garment polygon."

In an embodiment, sizes of triangles of a mesh (e.g., the third mesh or the fourth mesh) constituting a 3D virtual garment may be different for each body portion or all of the triangles may of the same size.

Figure 8:
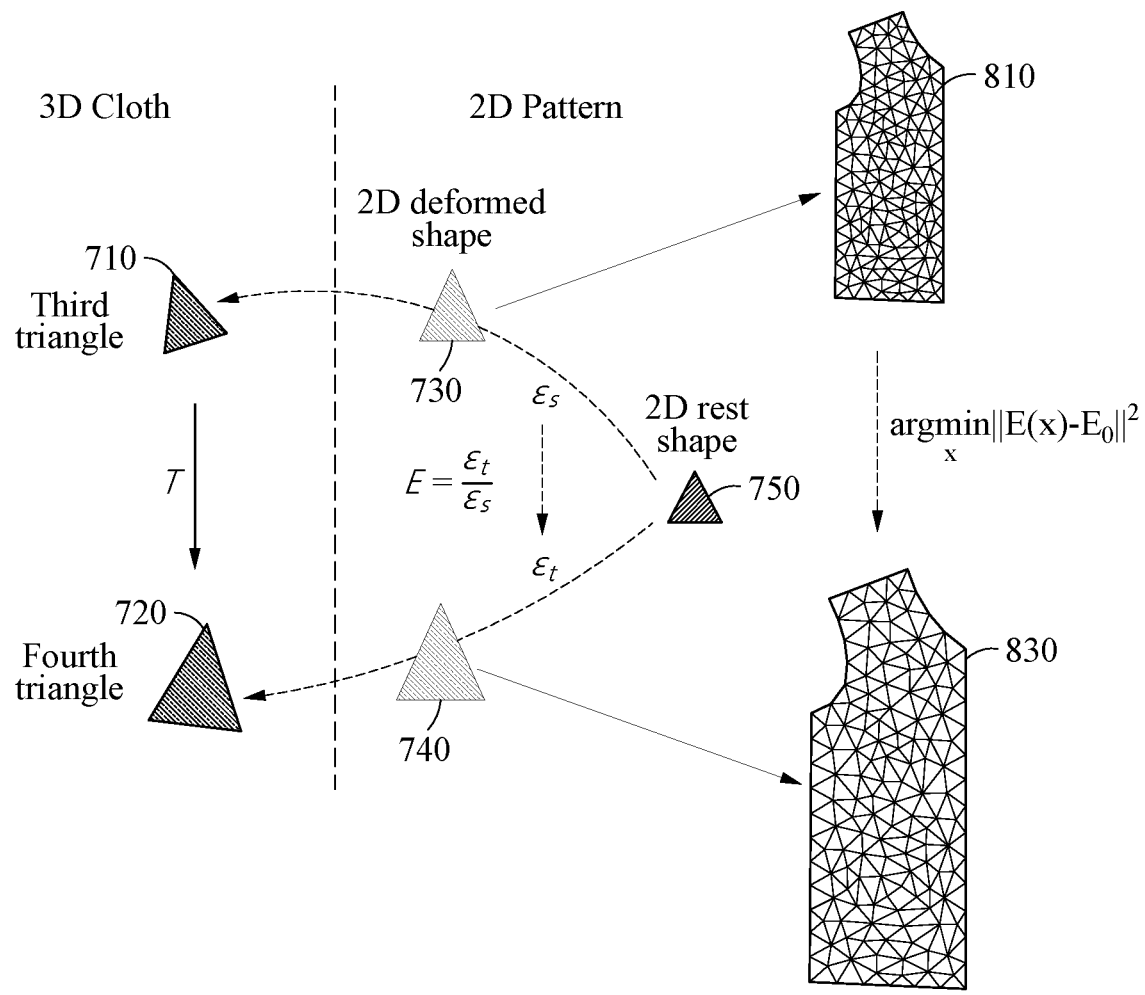
FIG. 8 is a conceptual diagram illustrating converting source patterns constituting a source garment into target patterns constituting a target garment based on a strain of a 2D pattern, according to an embodiment.

A 3D garment such as the source garment 120 and the target garment 140 may be composed of clothing patterns corresponding to respective body portions. Clothing patterns according to an embodiment may be virtual 2D clothing patterns 810 and 830 as shown in FIG. 8, which are modeled with triangles.

The mesh according to an embodiment may be modeled in various manners. For example, vertices of a polygon included in the mesh may be point masses, and sides of the polygon may be represented as springs having elasticity, which connect the point masses. Thus, the clothing patterns according to an embodiment may be modeled by, for example, a mass-spring model. The springs may have respective resist values depending on properties of used fabric, for example, for stretch, shear, and bending. Alternatively, the mesh may be modeled as a strain model. A polygon included in the mesh may be modeled as a triangle or may be modeled as a polygon greater than or equal to a quadrangle. In some cases, when a 3D volume should be modeled, the mesh may be modeled with a polyhedron.

Vertices included in the mesh may move according to action of an external force, such as gravity, and an internal force, such as stretch, shear, and bending. When a force being applied to each vertex is obtained by calculating the external force and the internal force, a speed of displacement and motion of each vertex may be obtained. Motion of the virtual garment may be simulated through motion of vertices of a polygon of the mesh in each time step. When 2D virtual clothing patterns composed of polygon meshes are draped over a 3D avatar, the 3D virtual garment of a natural appearance based on the laws of physics may be implemented.

Hereinafter, for convenience of description, 2D clothing patterns constituting a source garment are referred to as "source patterns," and 2D clothing patterns constituting a target garment are referred to as "target patterns." A mesh constituting source patterns is referred to as a "fifth mesh" or "source pattern mesh," and a triangle included in the fifth mesh is referred to as a "fifth triangle" or "source pattern polygon." Furthermore, a mesh constituting target patterns is referred to as a "sixth mesh" or "target pattern mesh," and a triangle included in the sixth mesh is referred to as a "sixth triangle" or "target pattern polygon."

In this case, the location of a triangle in each mesh may correspond to, for example, the coordinates of vertices of the triangle. Alternatively, the location of a triangle in each mesh may correspond to, for example, the location of the center of mass of the triangle.

Figure 2:
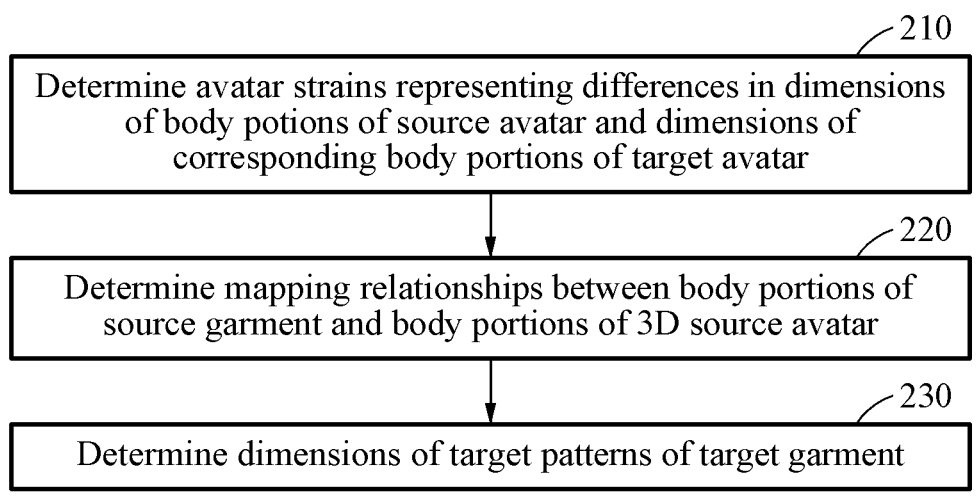
FIG. 2 is a flowchart illustrating an automatic grading method, according to an embodiment.

FIG. 2 is a flowchart illustrating an automatic grading method according to an embodiment. Referring to FIG. 2, an automatic grading device determines 210 first strain ratios or avatar strain ratios between a 3D source avatar and a 3D target avatar. The first strain ratios or avatar strain ratios refers to a deformation degree of body portion of the source avatar to coincide with the target avatar. The automatic grading device may calculate the first strain ratio based on, for example, a unit triangle constituting a mesh of the avatar. Herein, the unit triangle may correspond to, for example, a first triangle constituting a first mesh of the source avatar and/or a second triangle constituting a second mesh of the target avatar. In other words, the automatic grading device may calculate the first strain ratio based on a difference between the first triangle and the second triangle. The method for determining the first strain ratios or the avatar strain ratios in the automatic grading device will be described in detail below with reference to FIG. 3.

The automatic grading device may determine 220 mapping relationships between a 3D source garment draped over the source avatar and a body portion of the source avatar. The mapping relationships may indicate a portion of virtual 3D clothing patterns that correspond a body portion of the source avatar. When the source garment are draped over the source avatar, the automatic grading device may determine the mapping relationships between portions of 2D source patterns and a body portion of the source avatar, as described in detail below with reference to FIG. 4.

The automatic grading device may determine 230 the dimensions of target patterns of the target garment based on the first strain ratios and the mapping relationships. For example, the automatic grading device may determine first triangles of a body portion of the source avatar, which are adjacent to a third triangle of a third mesh constituting the source garment, based on the mapping relationships. The automatic grading device may deform the third triangle of the source garment into a fourth triangle of a fourth mesh constituting the target garment based on the first strain ratios. The automatic grading device may calculate a strain between a fifth triangle of a source pattern, corresponding to the third triangle, and a sixth triangle of a target pattern, corresponding to the fourth triangle, and may convert source patterns into target patterns based on the calculated strain. The method for determining the dimensions of the target patterns is described in detail below with reference to FIGS. 5 through 8.

The generated 2D target patterns constituting the target garment may be provided as an output from the automatic grading device, as described below in detail with reference to FIG. 9.

The automatic grading device may also deform a portion of a target pattern mapped to a corresponding portion by, for example, a strain for each body portion of the target avatar, while grading target patterns through an optimization process where all target patterns of the target garment retain a curvature of outlines of source patterns and/or a length ratio of sewing lines. Retaining the curvature of the outlines of the source patterns in the automatic grading device is described below in detail with reference to FIG. 10. Retaining the length ratio of the sewing lines of the source patterns in the automatic grading device is described in detail below with reference to FIG. 11.

Figure 3A:
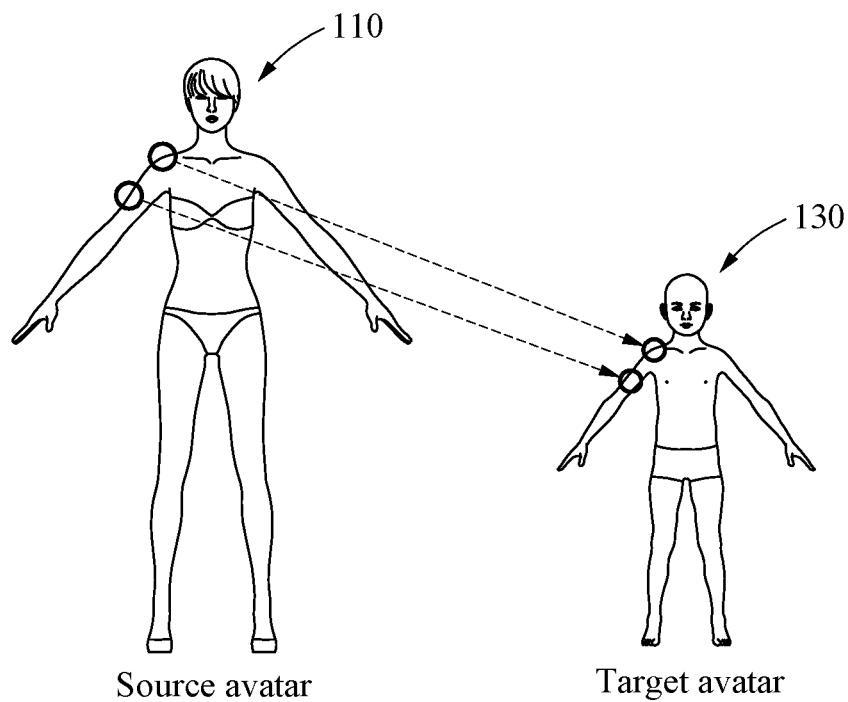
FIGS. 3A and 3B are conceptual diagrams a first strain ratio between a 3D source avatar and a 3D target avatar, according to an embodiment.
Figure 3B:
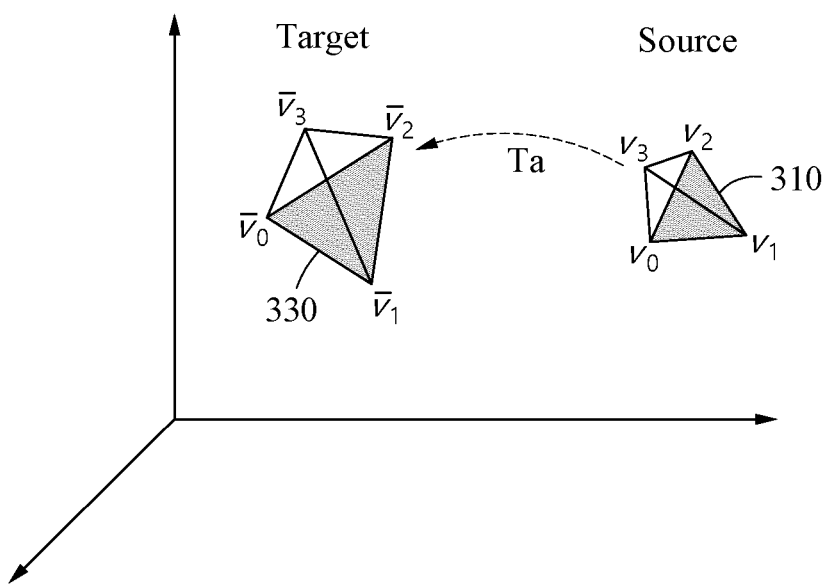

FIGS. 3A and 3B are conceptual diagrams illustrating a first strain ratio between a 3D source avatar and a 3D target avatar, according to an embodiment. Referring to FIG. 3A, a body portion of a 3D target avatar 130, corresponding to a body portion of a 3D source avatar, is shown. Furthermore, referring to FIG. 3B, a first triangle 310 of a first mesh constituting the 3D source avatar 110 and a second triangle 330 of a second mesh constituting the 3D target avatar 130 are shown.

In an embodiment, a strain between the body portion of the source avatar 110 and the body portion of the target avatar 130 may be defined in units of respective triangles constituting a mesh of each avatar. A method for calculating how much each triangle (e.g., the first triangle 310) of the source avatar 110 deforms on the target avatar 130 may correspond to avatar fitting.

An automatic grading device may determine whether a specific feature point of the source avatar 110 is fitted to any feature point of the target avatar 130 to know whether three points of the first triangle 310 of the source avatar 110 moves to any location on the target avatar 130. The automatic grading device may calculate a 3D transformation matrix indicating a deformation degree of a triangle based on the location on the target avatar 130 to which the three points of the first triangle 310 moves.

For example, it is assumed that locations (v0, v1, v2) of the three points of the first triangle 310 of the source avatar 110 and locations ($\bar{v}0$, $\bar{v}1$, $\bar{v}2$) of three points of the second triangle 330 of the target avatar 130 are given.

The automatic grading device may form a tetrahedron by expanding the first triangle 310 and the second triangle 330. The automatic grading device may form a first tetrahedron V based on the three points of the first triangle 310 and a second tetrahedron $\bar{V}$ based on the three points of the second triangle 330. By forming the first and second tetrahedrons, the source avatar 110 and the target avatar 130 may be modeled into 3D volume.

The first tetrahedron V may be represented as V=[v1−v0, v2−v0, v3−v0], and the second tetrahedron $\bar{V}$ may be represented as $\bar{V}$=[$\bar{v}1$−$\bar{v}0$, $\bar{v}2$−$\bar{v}0$, $\bar{v}3$−$\bar{v}0$]. In this case, one point v3 of the first tetrahedron V and one point $\bar{v}3$ of the second tetrahedron $\bar{V}$ may be positioned on a place vertically away from the midpoint of each triangle by $\sqrt{2}\times trianglearea$. As such, when the first tetrahedron V corresponding to the first triangle 310 and the second tetrahedron $\bar{V}$ corresponding to the second triangle 330 are given, the automatic grading device may obtain a transformation matrix Ta indicating a deformation degree between the first tetrahedron V and the second tetrahedron $\bar{V}$ as Equation (1):

$$\bar{V}=TaV; \quad Ta=\bar{V}V^{-1} \qquad (1)$$

The automatic grading device may calculate a strain ("first strain ratio") between the source avatar and the target avatar using the transformation matrix Ta.

According to an embodiment, the automatic grading device may calculate a strain between the source avatar and the target avatar using a correspondence map between a first mesh of the source avatar and a second mesh of the target avatar. In this case, the correspondence map may be calculated proportionally on the basis of, for example, a feature point such as the tip of the head of each avatar, the tip of the tiptoe of each avatar, or the tip of the arm of each avatar.

According to an embodiment, the automatic grading device may obtain a correspondence map by dressing the source avatar and the target avatar in a virtual reference garment having the same mesh topology. The virtual reference garment may be a virtual garment draped in intimate contact with the body of an avatar. The correspondence map may include information indicating triangle(s) of the second mesh of the target avatar, which correspond to triangle(s) of the first mesh of the source avatar. Because of dressing the source avatar and the target avatar in the virtual reference garment of the same mesh topology, triangle(s) of the second mesh of the target avatar, which correspond to triangle(s) of the first mesh of the source avatar, may be identified. For example, unique identifiers may be assigned to triangles included in the virtual reference garment. Because the identifiers of the triangles included in the virtual reference garment are not varied after the virtual reference garment are draped over the source avatar and the target avatar, a correspondence relationship between a triangle of the source avatar and a triangle of the target avatar, which have the same identifier, may be easily identified.

Figure 4:
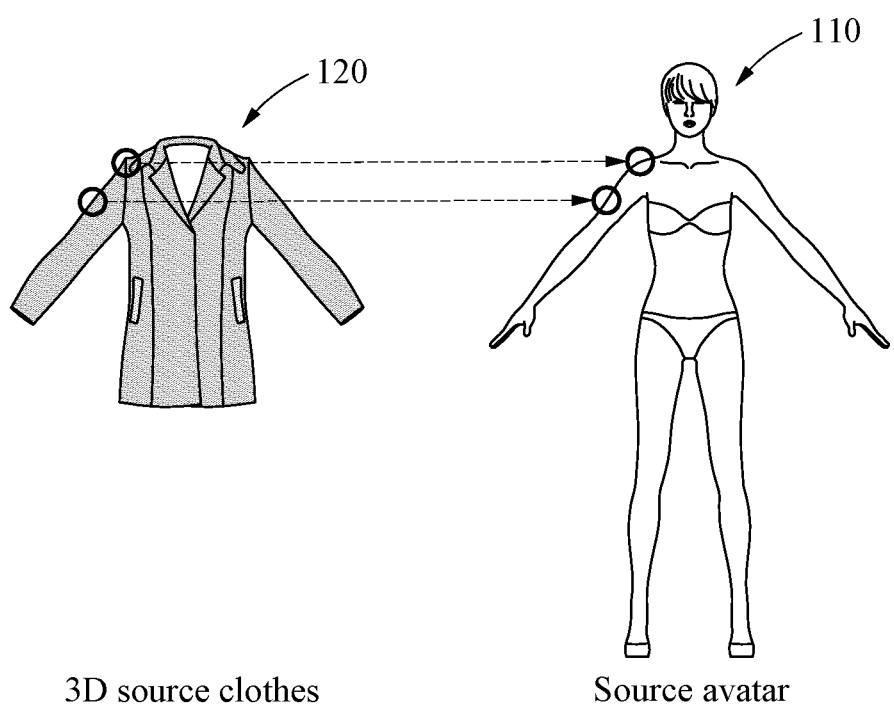
FIG. 4 is a drawing illustrating mapping of relationships between a 3D source garment draped over a source avatar and a body portion of the source avatar, according to an embodiment.

FIG. 4 is a conceptual diagram illustrating mapping relationships between a 3D source garment and a body portion of the source avatar according to an embodiment. Referring to FIG. 4, 3D source avatar 110 and 3D source garment 120 are shown. An automatic grading device may determine whether each portion of source patterns constituting the source garment 120 matches any body portion of a source avatar 110. The automatic grading device may determine mapping relationships using, for example, a mapping list mapping triangles of a mesh of the source avatar 110 that are close to each triangle of a mesh constituting the source garment 120. In detail, the automatic grading device determines mapping relationships between source patterns constituting the source garment 120 and a body portion of the source avatar 110.

The automatic grading device may search for first triangles adjacent to third triangles constituting a mesh of a sleeve pattern of the source garment 120. In this case, the automatic grading device may search for, for example, adjacent first triangles which are present within a certain distance from three points of each of the third triangles constituting the mesh of the sleeve pattern. The automatic grading device may register the adjacent first triangles with a mapping list corresponding to the sleeve pattern. A mapping list corresponding to a specific triangle of the source garment 120 may include, for example, one first triangle or a plurality of first triangles. According to an embodiment, the mapping list corresponding to the specific triangle of the source garment 120 may include first triangles of a certain region and/or first triangles of a certain direction.

The automatic grading device may determine mapping relationships by a body portion (e.g., right shoulder portion) of a corresponding source avatar using the mapping list.

Figure 5:
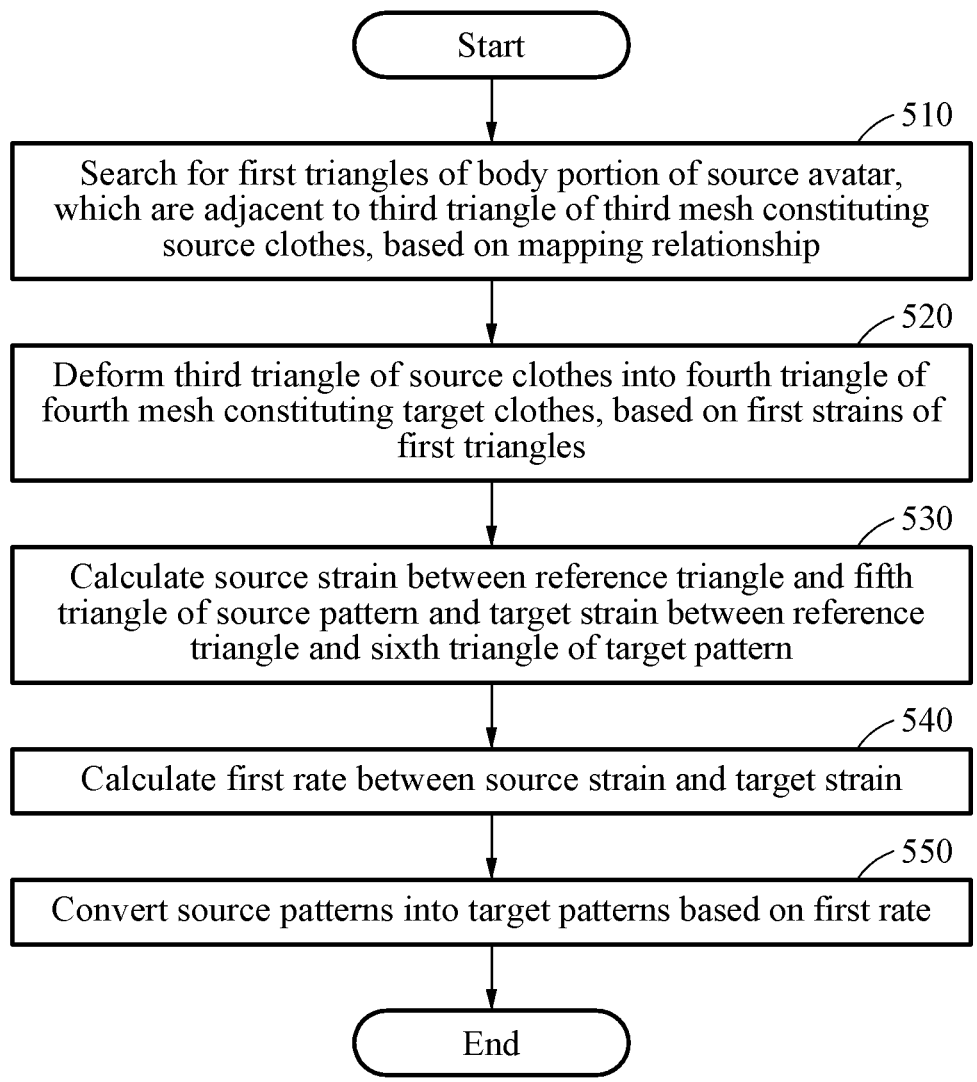
FIG. 5 is a flowchart illustrating a method for converting source garment into a 3D target garment draped over a target avatar, according to an embodiment.

FIG. 5 is a flowchart illustrating a method for converting a source garment into a 3D target garment draped over a target avatar according to an embodiment. Referring to FIG. 5, an automatic grading device may search 510 for first triangles of a body portion of a source avatar, which are adjacent to a third triangle of a third mesh constituting a source garment, based on mapping relationships.

The automatic grading device may deform 520 the third triangle of the source garment into a fourth triangle of a fourth mesh constituting a target garment, based on first strain ratios of the first triangles. Deformation between triangles of meshes constituting the source garment and the target garment are calculated 520, as described in detail below with reference to FIG. 6.

The automatic grading device may calculate 530 a source strain $\varepsilon_s$ between a reference triangle and a fifth triangle of a source pattern and a target strain $\varepsilon_t$ between the reference triangle and a sixth triangle of a target pattern. The automatic grading device may calculate 540 a first rate $E_0$ between the source strain and the target strain. Herein, the fifth triangle may correspond to a triangle of a 2D source pattern (a fifth mesh) corresponding to the third triangle of 3D source garment, and the sixth triangle may correspond to a triangle of a 2D target pattern (a sixth mesh) corresponding to the fourth triangle of 3D target garment. Operations 530 and 540 may be a process of calculating a strain between triangles of 2D patterns respectively corresponding to the 3D source garment and the 3D target garment, which will be described in detail with reference to FIGS. 7A and 7B below.

The automatic grading device may convert 550 source patterns into target patterns based on the first rate. Operation 550 may be a process of deforming a 2D pattern of 3D garment, mapped to a corresponding portion, based on a strain for each body portion of a target avatar, as described below in detail with reference to FIG. 8.

FIG. 6 is a conceptual diagram illustrating deforming of a triangle of source garment into a triangle of target garment according to an embodiment. Referring to FIG. 6, a process of deforming a third triangle of source garment 630 into a fourth triangle of target garment 640 based on first strain ratios from first triangles of a body portion of a source avatar 610 to second triangles of a body portion of a target avatar 620 is shown.

Due to the principle of grading, a garment may follow size deformation of an adjacent body portion of an avatar. Thus, an automatic grading device according to an embodiment may calculate deformation of a triangle of a mesh constituting the source garment 630 based on strains of strains of the first triangles of the body portion of the source avatar 610, which are mapped (e.g., adjacent) to a third triangle of a third mesh constituting the source garment 630.

As seen in FIG. 1 above, the strains of the first triangles of the body portion of the source avatar 610 may correspond to a first strain ratio between the source avatar 610 and the target avatar 620, which is represented as a transformation matrix $T_a$. In this case, strains $T_{a1}$ and $T_{a2}$ between the source avatar 610 and the target avatar 620 may be applied to a strain $T=f(T_{a1}, T_{a2})$ between the source garment 630 and the target garment 640, as shown in FIG. 6.

For example, when any one of the first triangles constituting the first mesh of the source avatar 610 is represented as $a_s$, a second triangle at constituting a second mesh of the target avatar 620 may be represented as $T_a \times a_s$. Furthermore, when any one of the third triangles constituting the third mesh of the source garment 630 is represented as $c_s$, a fourth triangle $c_t$ constituting a fourth mesh of the target garment 640 may be represented as $T \times c_s$. In this case, $T=f(T_{a1}, T_{a2})$ may correspond to an average of the strains $T_{a,i}$ of the first triangles as in Equation (2) set forth below.

For example, it is assumed that a set of first triangles of a body portion of the source avatar 610, which are mapped to a third triangle r of the third mesh constituting the source garment 630, is $Lr \in \{t_0, t_1, \ldots, t_n\}$. In this case, a strain $T_c$ of the third triangle of the third mesh constituting the source garment 630 may be calculated as an average of the strains $T_{a,i}$ of the first triangles of the body portion of the source avatar 610 as in Equation (2) set forth below:

$$T_c = \sum_{i=0}^{n-1} T_{a,i}/n \qquad (2)$$

where the strains $T_{a,i}$ of the first triangles of the body portion of the source avatar 610 may correspond to a value obtained by excluding rotation rigid transformation from Equation (1) above, that is, the result of performing only scale transformation and shear angle transformation.

As such, the automatic grading device may calculate statistics (e.g., an average) of the first strain ratios of the first triangles of the body portion of the source avatar 610 and may deform the third triangle of the third mesh constituting the source garment 630 into the fourth triangle of the fourth mesh constituting the target garment 640 based on the statistics of the first strain ratios of the first triangles.

In an embodiment, the automatic grading device may apply a transformation matrix of the source avatar 610 to the target garment 640 without change to accurately reflect deformation in a vertical direction for the source avatar 610 as well as deformation in a horizontal direction for the source avatar 610 in the target garment 640, thus accurately generating automatically graded target patterns irrespective of shapes of the garment.

Figure 7A:
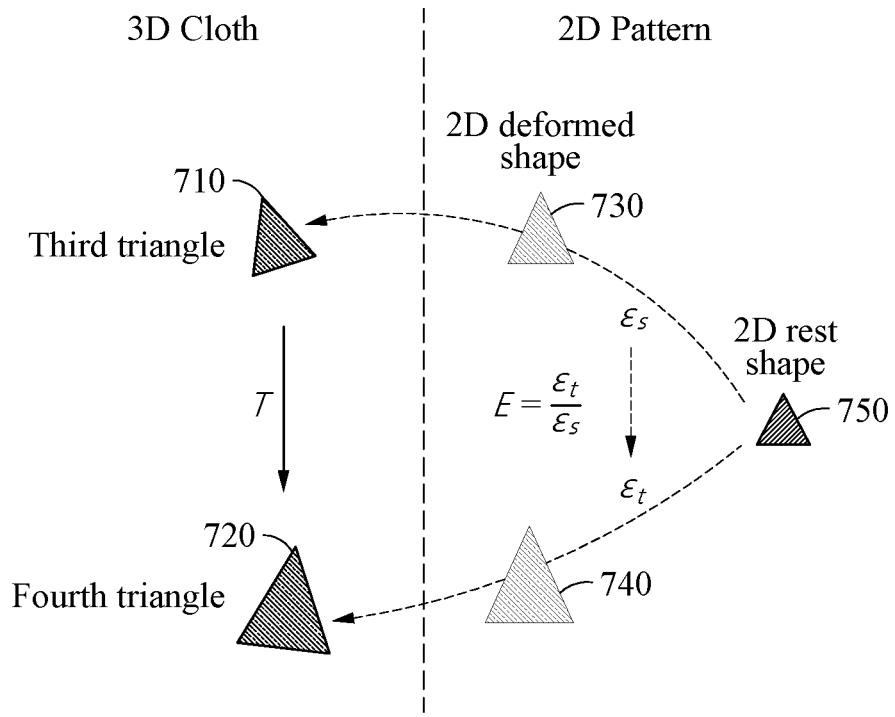
FIGS. 7A and 7B are conceptual diagrams illustrating strains of a 2D pattern, according to an embodiment.
Figure 7B:
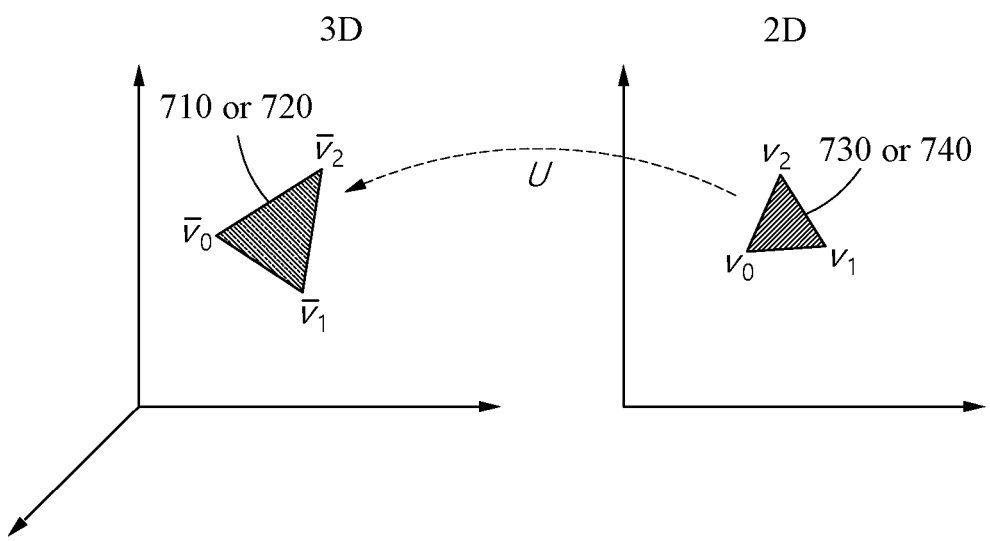

FIGS. 7A and 7B are drawings illustrating calculating of a strain ("first rate") of a 2D pattern according to an embodiment. FIG. 7A illustrates relationship between a fifth triangle 730 (also referred to as "source pattern polygon" herein) of a 2D source pattern (a fifth mesh) corresponding to a third triangle 710 (also referred to as "source garment polygon" herein), and a sixth triangle 740 (also referred to as "target pattern polygon" herein) of a 2D target pattern (a sixth mesh) corresponding to the fourth triangle 720 (also referred to as "target pattern polygon" herein), when deforming the third triangle 710 of 3D source garment into a fourth triangle 720 (also referred to as "target garment polygon" herein) of 3D target garment.

A 3D shape of garment may deform due to, for example, gravity, a collision between garment and garment, fabric tension, or the like. Such deformation of garment should also be reflected in 2D patterns constituting the garment to generate garment or clothing patterns, which fit an avatar well. Thus, in an embodiment, the deformation of the 3D shape of the garment may also be applied to 2D patterns constituting the garment.

For example, a shape strain between a reference triangle 750 and the fifth triangle 730 of the source pattern is referred to as source strain $\varepsilon_s$, and a shape strain between the reference triangle 750 and the sixth triangle 740 of the target pattern is referred to as target strain $\varepsilon_t$. Herein, the fifth triangle 730 may correspond to a triangle of the source pattern (the fifth mesh), corresponding to the third triangle 710. Furthermore, the sixth triangle 740 may correspond to a triangle of the target pattern (the sixth mesh), corresponding to the fourth triangle 720. Moreover, the reference triangle 750 may correspond to a virtual triangle which is a criterion on a 2D pattern, and may correspond to, for example, a triangle of an ideal state in which any external force is not applied. According to an embodiment, the reference triangle 750 may have a predetermined initial size or may have an average size of unit triangles of respective patterns depending on a design.

Referring to FIG. 7B, a drawing illustrating a relationship between a triangle 710 or 720 constituting the 3D garment and a triangle 730 or 740 constituting a 2D pattern is shown. The source strain $\varepsilon_s$ and the target strain $\varepsilon_t$, which are described above, may be calculated using Equation (3) below.

$$V=[v1-v0, v2-v0], \overline{V}=[\overline{v}1-\overline{v}2-\overline{v}0], U=V\overline{V}^{-1} \qquad (3)$$

where U may be the 2×3 matrix indicating the degree of scaling of the size of the first column vector of the matrix about an x-axis, and the degree of scaling of the size of the second column vector about a y-axis. Furthermore, the angle of the two column vectors may correspond to a shear angle.

Because a change in size is able to occur mainly in the direction of the x-axis and the y-axis when a 2D pattern is graded, an automatic grading device according to an embodiment may calculate a strain $\varepsilon=[\varepsilon_x, \varepsilon_y]$ by only using a size of the two column vectors, that is, only a scale value.

According to an embodiment, the automatic grading device may define a strain as $\varepsilon=[\varepsilon_x, \varepsilon_y, \theta]$ by including a shear angle as well as a scale value. In this case, triangles of patterns constituting respective garment in the grading process should be deformed by the target strain $\varepsilon_t$ from the original strain $\varepsilon_s$.

In an embodiment, a rate between the original strain $\varepsilon_s$ and the target strain $\varepsilon_t$ is referred to as a first rate E. The first rate E may be calculated as $$E = \frac{\varepsilon_t}{\varepsilon_s}.$$

The first rate E may also be referred to as an initial rate $E_0$.

FIG. 8 is a conceptual diagram illustrating converting of source patterns constituting a source garment into target patterns constituting a target garment based on a strain of a 2D pattern, according to an embodiment. Referring to FIG. 8, a sixth mesh candidate 830 of a 2D target pattern candidate, which is derived from a fifth mesh 810 of a 2D source pattern based on an objective function of maintaining a strain of a 2D pattern is shown.

An automatic grading device may deform all triangle meshes constituting 2D patterns such that a shape strain in 3D garment is maintained to be maximally the same in 2D patterns when shape deformation in the 3D garment occurs. For example, when a sixth triangle candidate of the sixth mesh candidate 830 of the target pattern candidate is determined, the automatic grading device according to an embodiment may calculate a target strain between a reference triangle and the sixth triangle candidate. The calculated target strain may correspond to a target strain candidate. The automatic grading device may calculate a second rate between a source strain and the target strain candidate. The automatic grading device may determine locations of points on the sixth mesh candidate 830 of the target pattern candidate to satisfy a first objective function of minimizing a difference between a first rate and the second rate.

As such, the process of calculating a location of each point on the sixth mesh candidate 830 of the target pattern candidate to maintain a 2D strain corresponding to a triangle of 3D garment may be achieved, for example, using an optimization algorithm or optimization process. The optimization process may be represented as Equation (4) below.

$$\underset{x}{\operatorname{argmin}} \|E(x) - E_0\|^2 \qquad (4)$$

where $x \in R^{2N}$ may correspond to a vector indicating locations of points (e.g., vertices) on the sixth mesh candidate of the 2D target pattern information.

Equation (4) above may correspond to a first objective function of minimizing a difference between a first rate $E_0$ and a second rate $E(x)$. The automatic grading device may calculate a location of a point on the sixth mesh candidate of the target pattern candidate such that the difference between the first rate $E_0$ and the second rate $E(x)$ is minimized.

The automatic grading device may obtain a solution where a gradient of the objective function of FIG. 4 above is 0 by, for example, a gradient descent technique. The automatic grading device may obtain 2D target patterns shown in FIG. 9 below by obtaining the solution of Equation (4) above.

Figure 9:
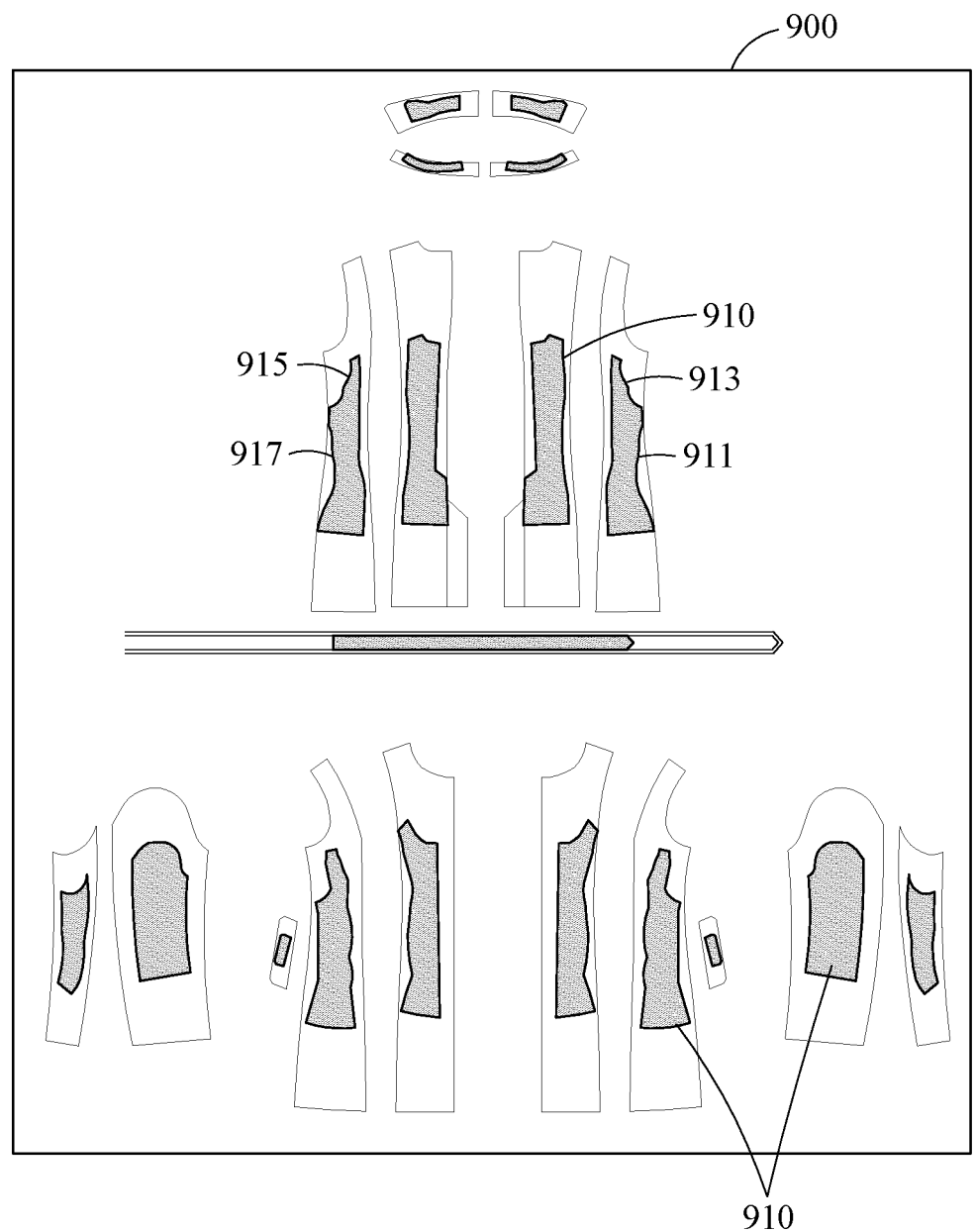
FIG. 9 is a drawing illustrating 2D target patterns constituting a target garment, according to an embodiment.

FIG. 9 is a drawing illustrating 2D target patterns constituting target garment, according to an embodiment. Referring to FIG. 9, 2D target patterns 910 and outlines 911, 913, 915, and 917 of the target patterns 910, which are output according to an embodiment, are shown.

The outlines 911, 913, 915, and 917 of the target patterns 910 shown in FIG. 9 are uneven and rough at the edges. For example, when a target avatar is smaller in body type than a source avatar, the whole target pattern may more decreases in size than a source pattern. In this case, due to a difference between a target strain of each triangle of a mesh constituting the target pattern and a target strain of a surrounding triangle, the outlines 911, 913, 915, and 917 of the target patterns 910 may have outlines that are not smooth. This may be caused because strains of triangles of a mesh of the target avatar, which are adjacent to the triangle of the mesh constituting the target pattern, are not consecutive.

An automatic grading device according to an embodiment may relax a first rate using, for example, Equation (5) below, to smoothen the outlines 911, 913, 915, and 917 of the 2D patterns as straight lines. The first rate relaxed by Equation (5) below may be displayed as $\hat{E}_0$.

$$E_i^{k+1} = \frac{E_i^k + \sum_{j \in S_{adj}} E_{ij}^k}{1 + \operatorname{count}(S_{adj})} \qquad (5)$$

where k denotes the iteration of relaxation, and $S_{adj}$ denotes a set of triangles j adjacent to triangle i of the 2D pattern.

The automatic grading device may obtain the relaxed strain $\hat{E}_0$ through a relaxation process of an initial target strain $E_0$ using Equation (5) above. According to an embodiment, the automatic grading device may obtain the relaxed strain $\hat{E}_0$ by applying moving average or low band filtering to points corresponding to outlines of 2D patterns.

The automatic grading device may obtain Equation (6) below by reflecting the relaxed strain $\hat{E}_0$ in the optimization formula of Equation 4 above.

$$\underset{x}{\operatorname{argmin}} \|E(x) - \hat{E}_0\|^2 \qquad (6)$$

The automatic grading device may determine, for example, locations of points on a sixth mesh candidate to satisfy a second objective function of minimizing a difference between a second rate $E(x)$ and the relaxed strain $\hat{E}_0$ by using an optimization algorithm or process corresponding to, for example, Equation (6). The automatic grading device may obtain 2D patterns having an outline that is more smooth, by using above Equation (6).

Figure 10:
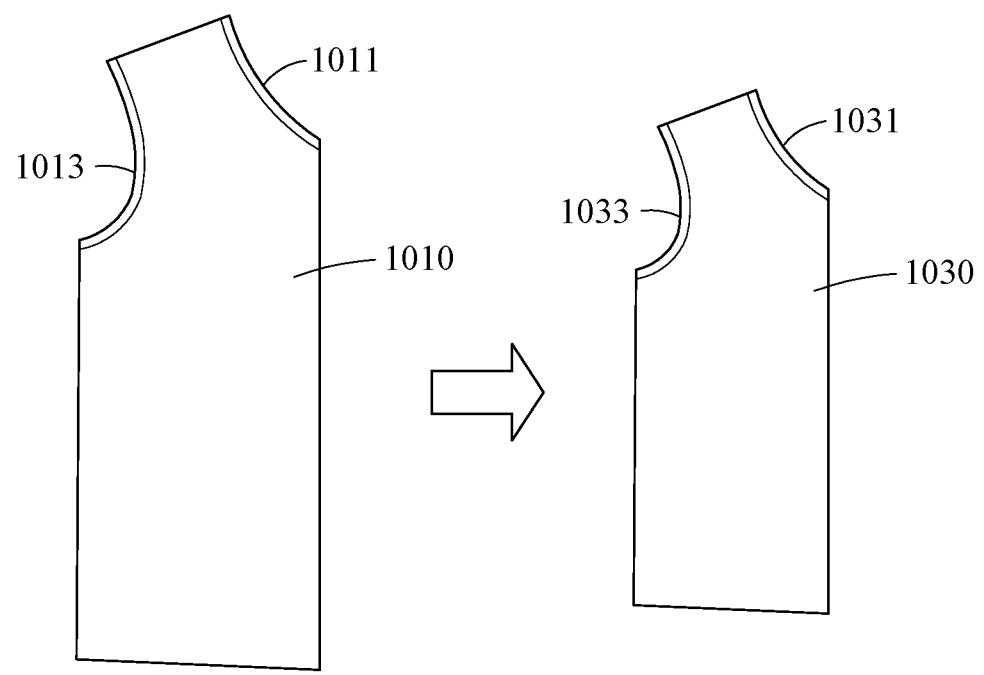
FIG. 10 is a drawing illustrating a method for maintaining curvature of an outline of a source pattern as in a target pattern, according to an embodiment.

FIG. 10 is a conceptual diagram illustrating maintaining curvature of an outline of a source pattern 1010 in a target pattern 1030, according to an embodiment. For example, when an outline or an inner line of the source pattern 1010 has a certain curvature like a neck portion 1011 and a sleeve portion 1013, an automatic grading device may allow a neck portion 1031 and a sleeve portion 1033 of the target pattern 1030 corresponding to the source pattern 1010 to maintain the same curvature as the source pattern 1010. In other words, the automatic grading device may allow points of a mesh on a curve of the target pattern 1030 to maintain a curvature of a curve of the source pattern 1010 with a range.

The automatic grading device may allow the target pattern 1030 to maintain a curvature of the source pattern 1010 using, for example, below Equation (7), which adds first constraints to maintain the curvature of the source pattern 1010 to the optimization scheme of above Equation (6).

$$\underset{x}{\operatorname{argmin}}\; w_e \|E(x) - \hat{E}_0\|^2 + w_b \|B(x) - B_0\|^2 \quad (7)$$

where $B_0$ denotes a first curvature vector for all points on the outline and the inner line of the source pattern 1010, $B(x)$ denotes a second curvature vector on all points on the target pattern 1030, $w_e$ denotes weight given to reducing strain differences, and $w_b$ denotes weight given to maintaining of the curvature.

The automatic grading device may set, for example, first constraints causing the second curvature (or the second curvature vector) for all points on the curves of the target pattern 1030 to maintain the first curvature (or the first curvature vector) for all points on the curves of the outlines and the inner lines of the source patterns 1010. The automatic grading device may determine locations of points on a sixth mesh candidate using Equation (7) above to satisfy the first constraints, in addition to the second objective function described above with reference to above Equation (6). The automatic grading device may obtain the solution of above Equation (7) above to generate the target pattern 1030 which reduces the difference between the curvature of outlines in the source pattern 1010 and the curvature of outlines in the target pattern 1030.

Figure 11:
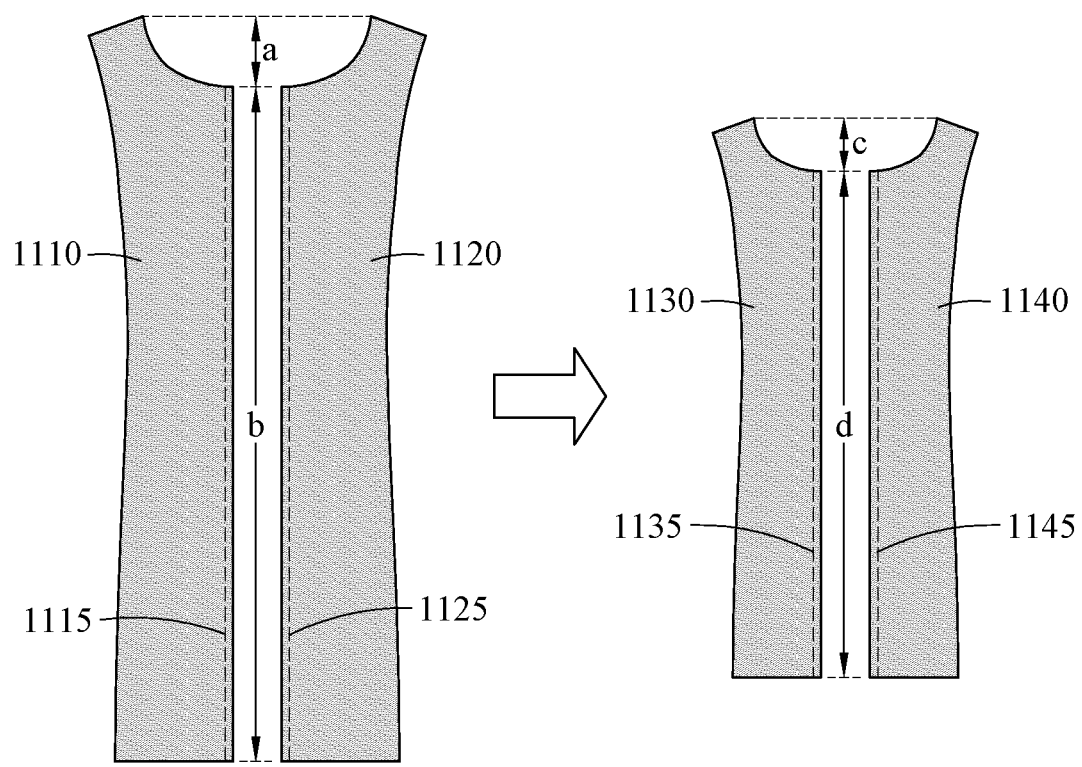
FIG. 11 is a drawing illustrating a method for maintaining a length ratio of sewing lines in source patterns which are sewn to each other, according to an embodiment.

FIG. 11 is a conceptual diagram illustrating maintaining a length ratio of sewing lines in source patterns 1110, 1120 in target patterns 1130, 1140, according to one embodiment. The source pattern 1110 and the source pattern 1120 may correspond to patterns which are connected with each other by being sewn by a sewing line 1115 and a sewing line 1125. In this case, information of the sewing lines 1115 and 1125 may be previously input to the source patterns 1110 and 1120, and the arranged source patterns 1110 and 1120 may be connected by the sewing lines 1115 and 1125 to be draped over a source avatar. As such, that the virtual garment are draped over the avatar by connecting the sewing lines of the patterns may also be applied to the target patterns 1130 and 1140 of a target garment.

After the grading, an automatic grading device may allow a length ratio between sewing lines (e.g., the sewing lines 1115 and 1125) which are sewn to each other in the source patterns 1110 and 1120 to be kept within a range in the target patterns 1130 and 1140. In other words, the automatic grading device may allow a length ratio (e.g., 1:1) between sewing lines 1135 and 1145 which are connected with each other on the target patterns 1130 and 1140 to be substantially the same as a length ratio (e.g., 1:1) between the sewing lines 1115 and 1125 which are connected with each other on the source patterns 1110 and 1120. When the length ratio between the sewing lines which are connected with each other is not maintained, the target garment may become wrinkled due to a length difference in seam.

To this end, in an embodiment, upon grading on a given target pattern after solving above Equation (7) above, a length ratio of a sewing line may be maintained. The automatic grading device may set, for example, second constraints causing a second length ratio of the sewing lines 1135 and 1145 between the target patterns 1130 and 1140, which are connected with each other by sewing in the target patterns 1130 and 1140 converted based on locations of points on a sixth mesh candidate to satisfy a first length ratio of the sewing lines 1115 and 1125 of the source patterns 1110 and 1120.

The automatic grading device may measure both lengths of the sewing lines 1135 and 1145 on the given target patterns 1130 and 1140 after solving above Equation (7) above and may calculate a target length of all segments on both the sewing lines 1135 and 1145 of the target patterns 1130 and 1140 to be the same as the first length ratio of the sewing lines 1115 and 1125 on the source patterns 1110 and 1120, using an optimization algorithm or process.

For example, when the calculated target length vector of all the segments is defined as $S_0$, the second constraints to maintain the target length may be represented as reducing a value corresponding to $|S(x) - S_o|^2$. In an embodiment, the automatic grading device may add the second constraints to maintain a length ratio of a sewing line to Equation 7 above to obtain an optimization formula as Equation (8) below.

$$\underset{x}{\operatorname{argmin}}\; w_e \|E(x) - \hat{E}_0\|^2 + w_b \|B(x) - B_0\|^2 + w_s \|S(x) - S_0\|^2 \quad (8)$$

In addition to the second objective function and the first constraints, the automatic grading device may determine locations of points on a sixth mesh candidate satisfying Equation (8) above, which satisfies the second constraints. The automatic grading device may obtain a solution of the Equation (8) to generate target patterns which maintain a source curvature and maintain a length ratio of sewing lines According to an embodiment, the automatic grading device may add third constraints to maximally maintain a pressure distribution of a source image upon optimization. According to an embodiment, a pressure distribution for a surface of a source avatar may be stored in a third mesh of the source garment. Thereafter, a pressure distribution of the source garment may be converted into a pressure distribution of the target garment according to a transformation relationship between the third mesh of the source garment and the first mesh of the source avatar. In other words, a portion, volume of which is increased in the source avatar, may be converted at a higher pressure in the source garment, and a portion, volume of which is reduced in the source avatar, may be converted at a lower pressure in the source garment. Thereafter, the automatic grading device may obtain 2D target patterns to satisfy the pressure distribution of the target garment, calculated by the above-mentioned strain.

Figure 12:
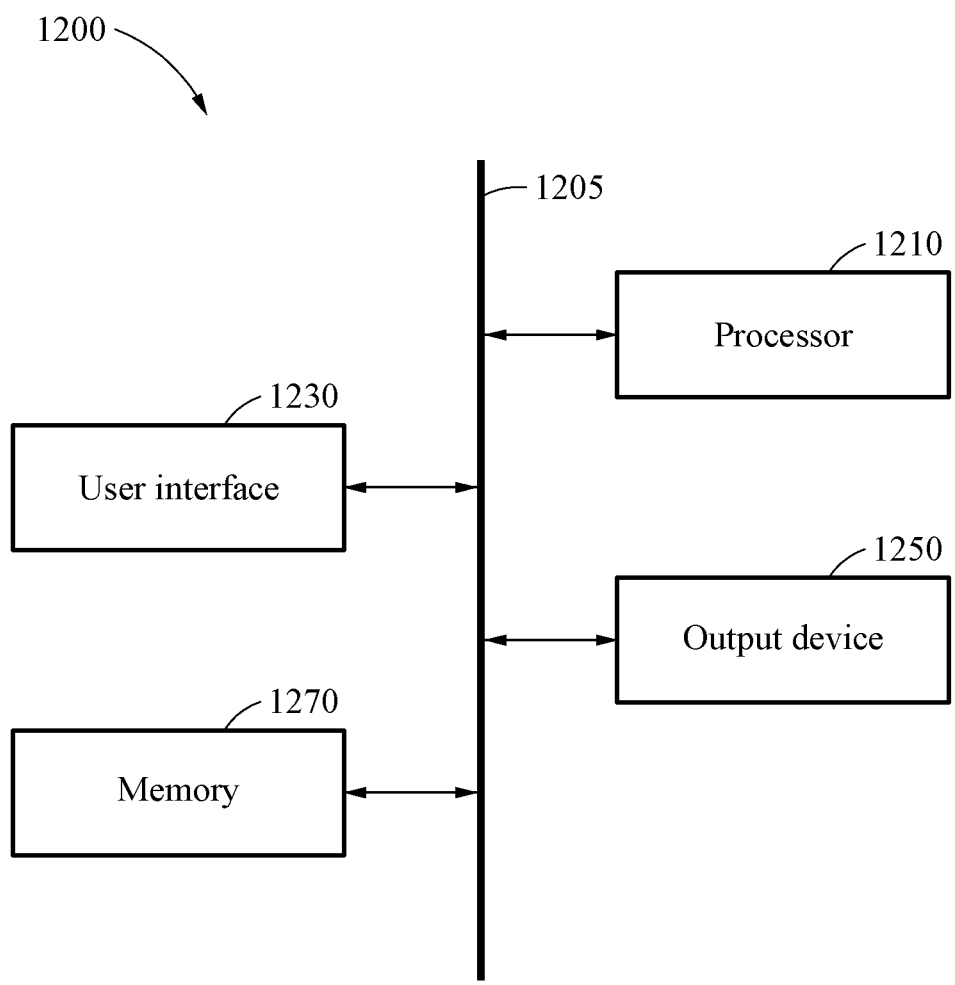
FIG. 12 is a block diagram illustrating an automatic grading device, according to an embodiment.

FIG. 12 is a block diagram illustrating an automatic grading device according to an embodiment. Referring to FIG. 12, an automatic grading device 1200 according to an embodiment may include a processor 1210, a user interface 1230, and an output device 1250. The automatic grading device 1200 may further include a memory 1270. The processor 1210, the user interface 1230, the output device 1250, and the memory 1270 may communicate with each other via a communication bus 1205.

The processor 1210 may calculate a first strain ratio between a 3D source avatar and a 3D target avatar. The processor 1210 may determine a mapping relationship between 3D source garment draped over the source avatar and a body portion of the source avatar. The processor 1210 may convert the source garment into 3D target garment draped over the target avatar, based on the first strain ratio and the mapping relationship.

The processor 1210 may discover, for example, first triangles of a body portion of the source avatar, which are adjacent to a third triangle of a third mesh constituting the source garment, based on the mapping relationship. The processor 1210 may deform the third triangle of the source garment into a fourth triangle of the target garment based on first strain ratios of the first triangles. The processor 1210 may calculate a strain between a fifth triangle of a source pattern, corresponding to the third triangle, and a sixth triangle of a target pattern, corresponding to the fourth triangle. The processor 1210 may convert source patterns into target patterns based on the calculated strain.

Alternatively, the processor 1210 may calculate a source strain between a reference triangle and the fifth triangle of the source pattern and a target strain between the reference triangle and the sixth triangle of the target pattern and may calculate a first rate between the source strain and the target strain. The processor 1210 may convert source patterns into target patterns based on the first rate. In this case, the fifth triangle may correspond to a triangle of a 2D source pattern (a fifth mesh), corresponding to the third triangle, and the sixth triangle may correspond to a triangle of a 2D target pattern (a sixth mesh), corresponding to the fourth triangle.

The processor 1210 may calculate statistics of the first strain ratios of the first triangles and may deform the third triangle into the fourth triangle depending on the statistics. The processor 1210 may calculate a second rate between the source strain and a target strain candidate of a target pattern candidate. The processor 1210 may determine locations of points on a sixth mesh candidate of the target pattern candidate to satisfy a first objective function of minimizing a difference between the first rate and the second rate. Herein, the target strain candidate may include a target strain between the reference triangle and a sixth triangle candidate of the 2D target pattern candidate (the sixth mesh candidate).

The processor 1210 may relax the first rate and may determine locations of points on the sixth mesh candidate to satisfy a second objective function of minimizing a difference between the second rate and the relaxed first rate.

The processor 1210 may set first constraints causing a second curvature for all points on a curve of target patterns to maintain a first curvature for all points on a curve of source patterns. The processor 1210 may determine locations of the points on the sixth mesh candidate to satisfy the first constraints, in addition to the second objective function.

The processor 1210 may set second constraints causing a second length ratio of sewing lines between patterns, which are connected with each other by sewing in the converted target patterns to satisfy a first length ratio of sewing lines of source patterns corresponding to the converted target patterns, based on the locations of the points on the sixth mesh candidate. The processor 1210 may determine locations of the points on the sixth mesh candidate to satisfy the second constraints, in addition to the second objective function and the first constraints.

The user interface 1230 may receive a selection for a 3D source avatar and a 3D target avatar. The user interface 1230 may include a touch input or the like through, for example, a stylus pen, a mouse, a keyboard, or a touch interface.

The output device 1250 may output a 2D target pattern constituting target garment. The output device 1250 may output 3D target garment draped over a 3D target avatar and/or 2D target patterns of the 3D target garment on its screen or to the outside of the automatic grading device 1200. The output device 1250 may be, for example, a display or a communication interface which communicates with the outside of the automatic grading device 1200. Furthermore, the output device 1250 may be a 2D pattern output device for outputting 2D target patterns constituting target garment as a separate output object such as a paper or fabric.

The memory 1270 may store, for example, a 3D source avatar input via the user interface 1230 and a 3D target avatar. Furthermore, the memory 1270 may store the first strain ratio between the 3D source avatar and the 3D target avatar, calculated by the processor 1210, and the mapping relationship between the 3D source garment draped over the source avatar and the body portion of the source avatar. Moreover, the memory 1270 may store the 3D target garment converted from the source garment by the processor 1210 and 2D target patterns constituting the target garment.

In addition, the processor 1210 may perform at least one method described above with reference to FIGS. 1 to 11 or an algorithm corresponding to the at least one method. The processor 1210 may execute a program to control the automatic grading device 1200. A program code executed by the processor 1210 may be stored in the memory 1270. The processor 1210 may be configured as, for example, a central processing unit (CPU), a graphics processing unit (GPU), or a neural network processing unit (NPU).

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An automatic grading method for a garment, comprising:
   determining avatar strain ratios, each of the avatar strain ratios representing differences in one or more source avatar polygons that are part of a mesh representing one or more body portions of a three-dimensional (3D) source avatar and one or more target avatar polygons that are part of another mesh representing corresponding one or more body portions of a 3D target avatar, the one or more body portions of the 3D source avatar having different shapes compared to the corresponding one or more body portions of the 3D target avatar;
   determining mapping relationships between portions of a 3D source garment and the one or more body portions of the 3D source avatar, the 3D source garment dimensioned for draping the 3D source avatar and comprising a plurality of adjoined two-dimensional (2D) source patterns; and
   determining shapes of 2D target patterns of a 3D target garment dimensioned for draping the 3D target avatar by processing the avatar strain ratios and the mapping relationships, the processing comprising:
      determining a second rate between a source strain and a target strain candidate of a target pattern candidate, wherein the target strain candidate represents a target strain between a reference polygon and a polygon of the target pattern candidate; and
      determining locations of the target pattern polygons that restrains a difference between a first rate determined based on the avatar strain ratios and the second rate by an optimization algorithm.

2. The automatic grading method of claim 1, wherein determining the shapes of the 2D target patterns includes:
   determining the one or more source avatar polygons mapped to each of source garment polygons as defined by the mapping relationships, wherein the one or more source avatar polygons are part of the mesh representing the one or more body portions of the 3D source avatar, and wherein the source garment polygons form a source mesh representing the 3D source garment;
   deforming each of the source garment polygons into each of target garment polygons that form a target mesh representing the 3D target garment by applying a garment transfer function to each of the source garment polygons, wherein the garment transfer function is a function of one or more transformation functions that transform the one or more source avatar polygons mapped to each of the source garment polygons into each of the one or more target avatar polygons;
   determining pattern strains between source pattern polygons corresponding to the source garment polygons and target pattern polygons corresponding to the target garment polygons; and
   generating the 2D target patterns by applying the determined pattern strains to the plurality of adjoined 2D source patterns.

3. The automatic grading method of claim 2, wherein each of the source garment polygons is deformed into each of the target garment polygons according to statistics on the avatar strain ratios.

4. The automatic grading method of claim 1, further comprises performing relaxing of the first rate determined based on the avatar strain ratios before determining the locations of the target pattern polygons.

5. The automatic grading method of claim 4, wherein the locations of the target pattern polygons are determined by further restraining deviations of curvatures of outlines of the 2D target patterns relative to curvature of outlines of the plurality of adjoined 2D source patterns.

6. The automatic grading method of claim 5, wherein the locations of the target pattern polygons are determined by further restraining deviations of ratios of sewing lines between adjoining ones of the 2D target patterns relative to ratios of sewing lines of adjoining ones of the plurality of adjoined 2D source patterns.

7. The automatic grading method of claim 1, wherein the avatar strain ratios are determined as deformations of unit polygons forming a mesh representing the 3D target avatar and corresponding unit polygons forming another mesh representing the 3D source avatar.

8. The automatic grading method of claim 1, wherein the avatar strain ratios are determined by:
   determining a transformation matrix indicating a deformation between a first tetrahedron defined by vertices of the one or more source avatar polygons forming the mesh representing the one or more body portions of the 3D source avatar and a second tetrahedron defined by vertices of the one or more target avatar polygons forming the other mesh representing the one or more body portions of the 3D target avatar, the one or more target avatar polygons corresponding to the one or more source avatar polygons, and
   deriving the avatar strain ratios from the transformation matrix.

9. The automatic grading method of claim 1, wherein the determining the mapping relationships includes:
   determining a mapping relationship between a first pattern among the plurality of adjoined 2D source patterns constituting the 3D source garment and the one or more body portions of the 3D source avatar.

10. The automatic grading method of claim 9, wherein determining the mapping relationships includes:
    determining, for each source avatar polygon, a subset of source garment polygons closest to each source avatar polygon as portions of the 3D source garment mapped to the one or more body portions of the 3D source avatar, and
    registering the subset of source garment polygons as being mapped to each source avatar polygon in a mapping list.

11. A non-transitory computer readable storage medium storing instructions thereon, the instructions when executed by a processor cause the processor to:
    determine avatar strain ratios, each of the avatar strain ratios representing differences in one or more source avatar polygons that are part of a mesh representing one or more body portions of a three-dimensional (3D) source avatar and one or more target avatar polygons that are part of another mesh representing corresponding one or more body portions of a 3D target avatar, the one or more body portions of the 3D source avatar having different shapes compared to the corresponding one or more body portions of the 3D target avatar;

determine mapping relationships between portions of a 3D source garment and the one or more body portions of the 3D source avatar, the 3D source garment dimensioned for draping the 3D source avatar and comprising a plurality of adjoined two-dimensional (2D) source patterns; and determine shapes of 2D target patterns of a 3D target garment dimensioned for draping the 3D target avatar by processing the avatar strain ratios and the mapping relationships, the processing comprising:

determining a second rate between a source strain and a target strain candidate of a target pattern candidate, wherein the target strain candidate represents a target strain between a reference polygon and a polygon of the target pattern candidate; and determining locations of the target pattern polygons that restrains a difference between a first rate determined based on the avatar strain ratios and the second rate by an optimization algorithm.

12. The non-transitory computer readable storage medium of claim 11, wherein the instructions causing the processor to determine the shapes of the 2D target patterns includes instructions to:

determine the one or more source avatar polygons mapped to each of source garment polygons as defined by the mapping relationships, wherein the one or more source avatar polygons are part of the mesh representing the one or more body portions of the 3D source avatar, and wherein the source garment polygons form a source mesh representing the 3D source garment;

deform each of the source garment polygons into each of target garment polygons that form a target mesh representing the 3D target garment by applying a garment transfer function to each of the source garment polygons, wherein the garment transfer function is a function of one or more transformation functions that transform the one or more source avatar polygons mapped to each of the source garment polygons into each of the one or more target avatar polygons;

determine pattern strains between source pattern polygons corresponding to the source garment polygons and target pattern polygons corresponding to the target garment polygons; and generate the 2D target patterns by applying the determined pattern strains to the plurality of adjoined 2D source patterns.

13. The non-transitory computer readable storage medium of claim 11, wherein the avatar strain ratios are determined as deformations of unit polygons forming a mesh representing the 3D target avatar and corresponding unit polygons forming another mesh representing the 3D source avatar.

14. The non-transitory computer readable storage medium of claim 11, wherein the instructions for determining the avatar strain ratios include instructions that cause the processor to:

determine a transformation matrix indicating a deformation between a first tetrahedron defined by vertices of the one or more source avatar polygons forming the mesh representing the one or more body portions of the 3D source avatar and a second tetrahedron defined by vertices of the one or more target avatar polygons forming the other mesh representing the one or more body portions of the 3D target avatar, the one or more target avatar polygons corresponding to the one or more source avatar polygons, and derive the avatar strain ratios from the transformation matrix.

15. The non-transitory computer readable storage medium of claim 11, wherein the instructions for determining of the mapping relationships include instructions that cause the processor to:

determine a mapping relationship between a first pattern among the plurality of adjoined 2D source patterns constituting the 3D source garment and the one or more body portions of the 3D source avatar.

16. The non-transitory computer readable storage medium of claim 11, wherein the instructions for determining the mapping relationships cause the processor to:

determine, for each source avatar polygon, a subset of source garment polygons closest to each source avatar polygon as portions of the 3D source garment mapped to the one or more body portions of the 3D source avatar, and register the subset of source garment polygons as being mapped to each source avatar polygon in a mapping list.

17. An apparatus for performing automatic grading of a garment, comprising:

a processor, and a memory coupled to the processor and storing instructions thereon, the instructions when executed by the processor cause the processor to:

determine avatar strain ratios, each of the avatar strain ratios representing differences in one or more source avatar polygons that are part of a mesh representing one or more body portions of a three-dimensional (3D) source avatar and one or more target avatar polygons that are part of another mesh representing corresponding one or more body portions of a 3D target avatar, the one or more body portions of the 3D source avatar having different shapes compared to the corresponding one or more body portions of the 3D target avatar;

determine mapping relationships between portions of a 3D source garment and the one or more body portions of the 3D source avatar, the 3D source garment dimensioned for draping the 3D source avatar and comprising a plurality of adjoined two-dimensional (2D) source patterns; and determine shapes of 2D target patterns of a 3D target garment dimensioned for draping the 3D target avatar by processing the avatar strain ratios and the mapping relationships, the processing comprising:

determining a second rate between a source strain and a target strain candidate of a target pattern candidate, wherein the target strain candidate represents a target strain between a reference polygon and a polygon of the target pattern candidate; and determining locations of the target pattern polygons that restrains a difference between a first rate determined based on the avatar strain ratios and the second rate by an optimization algorithm.

18. The automatic grading device of claim 17, wherein instructions causing the processor to determine the shapes of the 2D target patterns include instructions to:

determine the one or more source avatar polygons mapped to each of source garment polygons as defined by the mapping relationships, wherein the one or more source avatar polygons are part of the mesh representing the one or more body portions of the 3D source avatar, and wherein the source garment polygons form a source mesh representing the 3D source garment;

deform each of the source garment polygons into each of target garment polygons that form a target mesh representing the 3D target garment by applying a garment transfer function to each of the source garment polygons, wherein the garment transfer function is a function of one or more transformation functions that transform the one or more source avatar polygons mapped to each of the source garment polygons into each of the one or more target avatar polygons;

determine pattern strains between source pattern polygons corresponding to the source garment polygons and target pattern polygons corresponding to the target garment polygons; and generate the 2D target patterns by applying the determined pattern strains to the plurality of adjoined 2D source patterns.

\* \* \* \* \*